Patented Nov. 14, 1950

2,530,342

UNITED STATES PATENT OFFICE 2,530,342

CARBOHYDRATE C-NITROOLEFINS AND METHOD OF PREPARATION

John Clinton Sowden, St. Louis, Mo., assignor to Corn Products Refining Company, New York, N. Y., a corporation of New Jersey No Drawing. Application August 29, 1947, Serial No. 771,377

21 Claims. (Cl. 260—209)

This invention relates, generally, to the production of (1) the acetylated nitroölefins, (2) the acetylated didesoxynitroalcohols, and (3) the 2-desoxy aldoses of unsubstituted aldose sugars.

An important object of the invention is the provision of new and improved methods of producing the above mentioned derivatives of unsubstituted aldose sugars.

Another important object of the invention is the provision of the acetylated nitroölefins derived from unsubstituted aldose sugars, as new compositions of matter.

Still another important object of the invention is the provision of the acetylated didesoxynitroalcohols derived from unsubstituted aldose sugars, as new compositions of matter.

Certain other objects of the invention will, in part, be obvious, and will, in part, appear hereinafter.

The following synthesis of D-arabo-2 desoxyhexose (2-desoxyglucose) from D-arabinose will serve to illustrate the broad aspects of the invention:

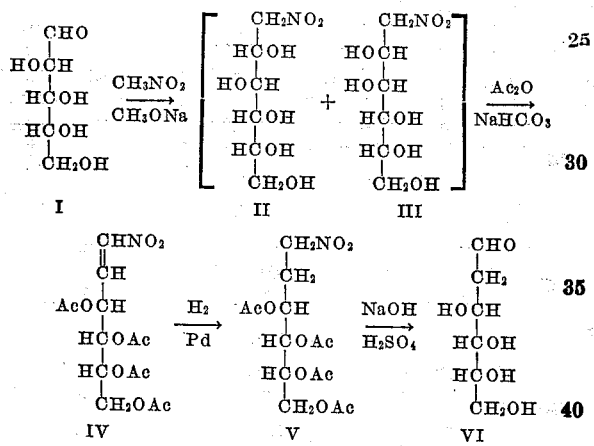

D-arabinose, I, is condensed with nitromethane in the presence of sodium methoxide to form the stereo-isomeric nitroalcohols, 1-nitro-1-desoxy-D-sorbitol, II, and 1-nitro-1-desoxy-D-mannitol, III. A detailed discussion of the preparation of these and other carbohydrate C-nitroalcohols is given in papers by Sowden and Fischer, Journal of the American Chemical Society, 66, 1312 (1944); 67, 1713 (1945); 68, 1511 (1946).

The nitroalcohols, II and III, without separation, are acetylated in known manner with acetic anhydride containing a catalytic amount of sulfuric acid so as to form the pentaacetates of II and III. These pentaacetates are refluxed with sodium bicarbonate in dry benzene to form D-arabo-tetraacetoxy-1-nitrohexene-1, IV. It will be noted that only one acetylated nitroölefin, IV, is formed in this reaction, since the formation of the double bond destroys the asymmetry of the second carbon atom of the acetylated nitroalcohols, II and III.

When the acetylated nitroölefin, IV, from D-arabinose is reduced in absolute alcohol with hydrogen and palladium black, one mole of hydrogen is rapidly taken up by the double bond, whereas the ensuing reduction of the nitro-group is much slower. By interrupting the reduction after the absorption of the first mole of hydrogen, it is possible to isolate the acetylated 1,2-didesoxynitroalcohol, V, in good yield. When this latter substance is deacetylated with excess aqueous alkali, and the resulting solution of sodium nitroalcohol is added to moderately concentrated sulfuric acid, D-arabo-2-desoxyhexose, VI, (the name used here for this desoxy sugar follows the nomenclature proposed by Sowden, Journal of the American Chemical Society, 69, 1047 (1947)) can be isolated from the resulting solution as its benzylphenylhydrazone in 70 percent yield.

Below are given the formulae for several of the compounds referred to in the examples:

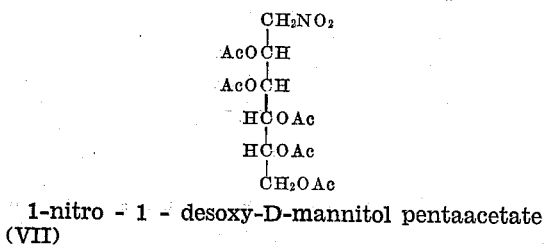

1-nitro - 1 - desoxy-D-mannitol pentaacetate (VII)

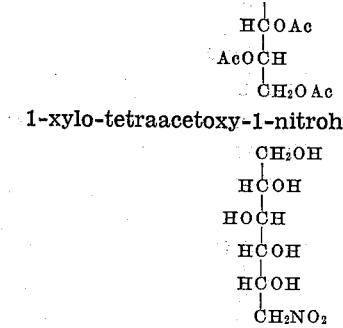

1-xylo-tetraacetoxy-1-nitrohexene-1 (VIII)

$$\begin{array}{c} CH_2OH \\ HCOH \\ HOCH \\ HCOH \\ HCOH \\ CH_2NO_2 \end{array}$$

6-nitro-6-desoxy-D-sorbitol (IX)

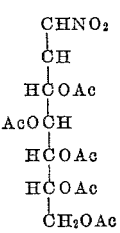

D - gluco-pentaacetoxy-1-nitroheptene-1 (X)

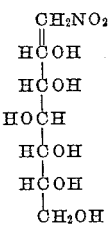

1-nitro-1-desoxy-D-α-glucoheptitol (XI).

The nitroölefins and acetylated nitroölefins, described herein, have been given systematic names as derivatives of the corresponding aliphatic olefins, using the appropriate prefix to signify their carbohydrate configuration. Thus, IV, is named D-arabo-tetraacetoxy-1-nitrohexene-1. The nitroölefins as a class may be designated as polyhydroxyalkyl-1-nitroalkenes and the acetylated nitroölefins as polyacetoxy-1-nitro-1-alkenes. The didesoxynitroalcohols as a class may be designated as 2-polyhydroxyalkyl-1-nitroalkanes and the acetylated didesoxynitroalcohols as 2-polyacetoxyalkyl-1-nitroalkanes.

I have found that the synthesis and reactions outlined above, starting with D-arabinose, I, as illustrative, are applicable, generally, to unsubstituted aldose sugars. In each instance, the corresponding acetylated carbohydrate C-nitroölefins have been obtained in crystalline condition and in good yield. These acetylated carbohydrate C-nitroölefins were found to crystallize with extreme ease, even from solutions containing large amounts of other acetylated carbohydrate material.

The acetylated carbohydrate C-nitroölefins may be readily reduced catalytically to the corresponding acetylated 1,2-didesoxynitroalcohols. These latter substances may be readily converted to the corresponding 2-desoxyaldoses by deacetylation followed by removal of the nitrogroup by treatment with sulfuric acid. The yields are generally good throughout the synthesis.

The following examples, which are intended as informative and typical only and not in a limiting sense, will further illustrate the invention, which is intended to be limited only in accordance with the scope of the appended claims.

*Example 1*

1-nitro - 1 - desoxy-D-mannitol pentaacetate (VII).—Three grams of 1-nitro-1-desoxy-D-mannitol (Sowden and Fischer, Journal of the American Chemical Society, 66, 1312 (1944)) was acetylated on the steam bath for one-half hour with 20 cc. of acetic anhydride containing one drop of sulfuric acid. After cooling, the solution was poured onto ice and water and there resulted 5.26 g. (88%) of the crystalline pentaacetate. After recrystallization from a mixture of ether and petroleum ether, the product melted at 88 to 89° C. and showed $(\alpha)_D^{23}+37.8°$ in absolute chloroform, c 7.3. Anal. Calcd. for $C_{16}H_{23}O_{12}N$ (421.3); C, 45.6; H, 5.50. Found: C, 45.7; H, 5.53.

Neither pyridine nor sodium acetate were found to be satisfactory acetylation catalysts for the nitroalcohol, both yielding dark colored sirups.

D - arabo-tetraacetoxy-1-nitrohexene-1 (IV). From the nitroalcohol pentaacetate.—One gram of 1-nitro-1-desoxy-D-mannitol pentaacetate in 20 cc. of dry benzene was refluxed for 2½ hours with 1 g. of sodium bicarbonate. The mixture was cooled, filtered and concentrated to dryness. The resulting crystalline residue on recrystallization from a mixture of ether and petroleum ether yielded 0.74 g. (86%) of the acetylated nitroölefin. The pure product melted at 115 to 116° C. and showed $(\alpha)_D^{23}+32.4°$ in absolute chloroform, c 5.2. Anal. Calcd. for $C_{14}H_{19}O_{10}N$ (361.3): C, 46.5; H, 5.30. Found: C, 46.4; H, 523.

*Example 2*

D - arabo - tetraacetoxy-1-nitrohexene (IV). From D-arabinose.—A suspension of 10 g. of D-arabinose in 50 cc. of absolute methanol and 50 cc. of nitromethane was shaken with 75 cc. of methanol containing 2.1 g. of sodium. The sugar dissolved rapidly and an amorphous precipitate of the sodium nitroalcohols began to appear after a few minutes. After shaking for 20 hours, the mixture was diluted with 60 cc. of dry ether and the precipitate was filtered and washed successively with cold methanol, ether and petroleum ether. After drying over phosphorus pentoxide, the light colored powder weighed 15.3 g. and contained 9.05% of sodium. The powder was dissolved in 100 cc. of water and immediately passed through a column containing a cation-exchange resin operating on the hydrogen cycle. These synthetic ion-exchange materials are phenol-formaldehyde, sulfonic acid derivatives and are described in the following paper and elsewhere in the literature: Adams & Holmes, Journal Soc. Chem. Ind., 54, 1–6T (1935). Concentration of the effluent at reduced pressure and thorough drying over phosphorus pentoxide yielded 11 g. of light yellow sirup. Acetylation of this sirup on the steam bath for one hour with 120 cc. of acetic anhydride containing one drop of sulfuric acid yielded 20 g. of the sirupy acetates. Treatment of this sirup in 250 cc. of benzene with 20 g. of sodium bicarbonate, as described above, followed by concentration of the resulting filtered solution then gave 9.7 g. (40%) of the acetylated nitroölefin. After recrystallization from absolute ethanol, the product melted at 115 to 116° C.

*Example 3*

L - xylo-tetraacetoxy-1-nitrohexene-1 (VIII). From 6-nitro-6-desoxysorbitol (IX).—Ten grams of the nitroalcohol (Sowden and Fischer, Journal of the American Chemical Society, 67, 1713 (1945)) were acetylated for 24 hours at room temperature with 50 cc. of acetic anhydride containing one drop of sulfuric acid. The acetylation mixture was then poured onto ice and water and the resulting sirup extracted with chloroform. Concentration of the extract yielded a colorless sirup which failed to crystallize. Treatment of this sirup in benzene solution with sodium bicarbonate, as described above in Example 2, gave 14.9 g. (87%) of the crystalline acetylated nitroölefin, M. P. 115 to 116° C. For analysis, the product was recrystallized from absolute ethanol. It then melted at 115 to 116° C. and showed $(\alpha)_D^{22}-9.8°$ in absolute chloroform, c 5.4. Anal. Calcd. for $C_{14}H_{19}O_{10}N$ (361.3): C, 46.5; H, 5.30; N, 3.88. Found: C, 46.5; H, 5.26; N, 3.69.

Example 4

L - xylo-tetraacetoxy-1-nitrohexene-1. From L-xylose.—When 7 g. of L-xylose (prepared from 2,4-benzylidene sorbitol by the method of v. Vargha, Ber., 68, 18 (1935)) was treated exactly as described above in Example 2 for D-arabinose, therewas obtained 3.55 g. (21%) of the crystalline, acetylated nitroölefin. After crystallization from absolute ethanol, the product melted at 115 to 116° C.

Example 5

D - gluco-pentaacetoxy-1-nitroheptene-1 (X). From 1 - nitro - 1 - desoxy-D-α-glucoheptitol (XI).—Acetylation of 1 g. of 1-nitro-1-desoxy-D-α-glucoheptitol (Sowden and Fischer, Journal of the American Chemical Society, 68, 1511, (1946)) with acetic anhydride and sulfuric acid yielded 1.54 g. (75%) of the crude, crystalline hexaacetate, M. P. 72 to 75° C. The hexaacetate contained a small amount of the acetylated nitroölefin, M. P. 106 to 107° C., described below, and purification by recrystallization was found to be very difficult. Accordingly, the crude material was converted directly to the acetylated nitroölefin by treatment in benzene solution with sodium bicarbonate. The product, obtained in 81 percent yield from the hexaacetate, was recrystallized from absolute ethanol and then melted at 106 to 107° C. and showed $(\alpha)_D^{20}+18°$ in absolute chloroform, c 4.2. Anal. Calcd. for $C_{17}H_{23}O_{12}N$ (433.4): C, 47.1; H, 5.35; N, 3.23. Found: C, 46.8; 5.12; N, 3.57.

Example 6

D - xylo-tetraacetoxy-1-nitrohexene-1.—Ten grams of D-xylose, when treated as described above in Example 2 for D-arabinose, yielded 8.45 g. (35%) of the corresponding acetylated nitroölefin. After recrystallization from absolute ethanol, the product melted at 115 to 116° C. and showed $(\alpha)_D^{25}+10.2°$ in absolute chloroform. Anal. Calcd. for $C_{14}H_{19}O_{10}N$ (361.3): C, 46.5; H, 5.30; N, 3.88. Found: C, 46.5; H, 5.30; N, 3.80.

Example 7

D - ribo-tetraacetoxy-1-nitrohexene-1.—Ten grams of D-ribose, when treated, as described above in Example 2 for D-arabinose, yielded 5.15 g. (21%) of the corresponding acetylated nitroölefin. Recrystallized from absolute ethanol, the product melted at 86 to 87° C. and showed $(\alpha)_D^{20}+17°$ in absolute chloroform, c 5. Anal. Calcd. for $C_{14}H_{19}O_{10}N$ (361.3): C, 46.5; H, 5.30; N, 3.88. Found: C, 46.5; H, 5.28; N, 3.87.

Unlike the acetylated nitroölefins described above, which were all very pale yellow in color, the product from D-ribose was colorless.

Example 8

1-nitro-1, 2-didesoxy-D-arabohexitol tetraacetate (V).—Two grams of the acetylated nitroölefin, IV, Example 1, in 20 cc. of absolute ethanol were shaken with hydrogen at room temperature and pressure in the presence of 0.2 g. of palladium black following the technique described by Tausz and Putnoky, Ber., 52, 1573 (1919). One mole of hydrogen was absorbed in 12 minutes and the rate of reduction then dropped sharply. Concentration and cooling of the filtered solution yielded 1.58 g. (79%) of the acetylated didesoxynitroalcohol, M. P. 81 to 86° C. Recrystallization from absolute ether gave the pure product, M. P. 91 to 92° C. and $(\alpha)_D^{26}+29.4°$ in absolute chloroform, c 2.5. Anal. Calcd. for $C_{14}H_{21}O_{10}N$ (363.3): C, 46.3; H, 5.83. Found: C, 46.8; H, 5.88.

Example 9

D - arabo-2-desoxyhexose, ("2-desoxyglucose" (VI).—One gram of the crude acetylated didesoxynitroalcohol, M. P. 84 to 86° C., described above in Example 8, was dissolved at room temperature in 15 cc. 1 normal sodium hydroxide solution and allowed to stand for one hour. The solution was then added to a stirred mixture of 3 cc. of water and 2.1 cc. of sulfuric acid at room temperature. The solution was diluted and neutralized by stirring with barium carbonate. After centrifuging and filtering, the solution was treated with a few drops of acetic and was concentrated to dryness at reduced pressure. Treatment of the resulting sirup with 0.6 cc. of benzylphenylhydrazine in 10 cc. of 75 percent ethanol then yielded 0.6 g. (71%) of D-arabo-2-desoxyhexose benzylphenylhydrazone.

After recrystallization from ethyl acetate, the hydrazone melted at 158 to 159° C. and showed $(\alpha)_D^{25}+7.6°$ in methanol, c 1.2.

Cleavage of the hydrazone with benzaldehyde according to the directions of Bergmann, Schotte and Lechinsky, Ber., 55, 158 (1922) gave the crystalline D-arabo-2-desoxyhexose;

$$(\alpha)_D^{23}+46.6°$$

(1 hour) in water, c 2.

The desoxy sugar apparently was obtained as a mixture predominating in the α-form since its initial melting point of 128 to 129° C. was lowered to 123 to 125° C. on recrystallization and a slight downward mutarotation was evident in its aqueous solution: $(\alpha)_D^{23}-25+53.8°$, 10 minutes; $+50.3°$; 20 minutes; $+48°$; 30 minutes; $+46.6°$, 1 hour (constant).

In the above examples, the acetylated carbohydrate C-nitroalcohols have been treated with sodium bicarbonate in benzene to give the corresponding acetylated nitroölefins. In this treatment, the sodium bicarbonate may be replaced with another alkali metal bicarbonate, such as potassium bicarbonate. The benzene takes no part in the treatment but serves as a suspension medium for the reactants. Hence, it may be replaced with other compounds, such as nitrobenzene, ether, chloroform, methanol, ethanol, etc.

I claim:

1. The process of making polyacetoxy-1-nitro-1-alkenes which comprises acetylating 1-nitro-1-desoxyalditols and effecting chemical reaction between the resulting acetylated compounds and an alkali metal bicarbonate by refluxing in dry benzene.

2. The process of making 2-polyacetoxyalkyl-1-nitroalkanes which comprises catalytically reducing polyacetoxy-1-nitro-1-alkenes.

3. The process of making 2-desoxyaldoses which comprises deacetylating 2-polyacetoxyalkyl-1-nitroalkanes and removing the nitro group from the resulting 2-polyhydroxyalkyl-1-nitroalkanes by hydrolysis thereof.

4. The process of making 2-polyacetoxyalkyl-1-nitrolakanes which comprises acetylating 1-nitro-1-desoxyalditols, effecting chemical reaction between the resulting acetylated compounds and an alkali metal bicarbonate by refluxing in dry benzene thereby forming polyacetoxy-1-nitro-1-alkenes and catalytically reducing the resultant polyacetoxy-1-nitro-1-alkenes.

5. The process of making 2-desoxyaldoses which comprises acetylating 1-nitro-1-desoxyalditol, effecting chemical reaction between the resulting acetylated compound and an alkali metal bicarbonate by refluxing in dry benzene thereby forming polyacetoxy-1-nitro-1-alkene, catalytically reducing the resultant polyacetoxy-1-nitro-1-alkene, deacetylating the resultant 2-polyacetoxyalkyl-1-nitroalkane, and removing the nitro group from the resultant 2-polyhydroxyalkyl-1-nitroalkane.

6. The process of claim 1 wherein the acetylated 1-nitro-1-desoxyalditols are refluxed with sodium bicarbonate in dry benzene.

7. The process of claim 3 wherein the 2-polyacetoxyalkyl-1-nitroalkanes are deacetylated by dissolution in alkali metal hydroxide, followed by acidification with sulfuric acid, neutralization by an alkaline earth metal carbonate, filtration, treatment with benzylphenylhydrazine and cleavage with benzaldehyde.

8. As a new composition of matter polyacetoxy-1-nitro-1-alkene.

9. As a new composition of matter 2-polyacetoxyalkyl-1-nitroalkane.

10. The process of claim 1 wherein acetic anhydride containing a catalytic amount of sulfuric acid is the acetylating medium.

11. The process of claim 2 wherein said catalytic reduction is carried out by hydrogen in the presence of palladium black.

12. The process of making 1-nitro-1, 2-didesoxy-D-arabohexitol tetraacetate which comprises reducing D-arabotetraacetoxy-1-nitrohexene-1 with hydrogen in the presence of palladium black.

13. As a new composition of matter 1-nitro-1, 2-didesoxy-D-arabohexitol tetraacetate.

14. As a new composition of matter D-glucopentaacetoxy-1-nitroheptene-1.

15. The process of making D-gluco-pentaacetoxy-1-nitroheptene-1 which comprises acetylating 1-nitro-1-desoxy-D-α-glucoheptitol, and subjecting the resulting acetylated nitroalcohol to treatment with an alkali metal bicarbonate.

16. The process of claim 15 wherein the acetylating medium is acetic anhydride containing a catalytic amount of sulfuric acid.

17. The process of claim 15 wherein the resultant acetylated 1-nitro-1-desoxy-D-α-glucoheptitol is refluxed with sodium bicarbonate in dry benzene.

18. The process of making D-arabo-2-desoxyhexose which comprises dissolving 1 - nitro - 1,2-didesoxy-D-arabohexitol tetraacetate in alkali metal hydroxide, followed by acidification with sulfuric acid, neutralization by an alkaline-earth metal carbonate, filtration, treatment with benzylphenylhydrazine, and cleavage with benzaldehyde.

19. The process of making D-arabo-tetraacetoxy-1-nitrohexene-1 which comprises acetylating at least one carbohydrate C-nitroalcohol selected from the group consisting of 1-nitro-1-desoxy-D-sorbitol and 1-nitro-1-desoxy-D-mannitol, and subjecting the resulting acetylated nitroalcohol to treatment with an alkali metal bicarbonate by refluxing in dry benzene.

20. The process of claim 19 wherein the acetylating medium is acetic anhydride containing a catalytic amount of sulfuric acid.

21. As a new composition of matter D-arabo-desoxyacetoxy-1-nitrohexene-1.

JOHN CLINTON SOWDEN.

REFERENCES CITED

The following references are of record in the file of this patent:

Iselin et al., Helvetica Chim. Acta, vol. 27, p. 1146-9 (1944).

Sowden et al. (1) J. A. C. S., vol. 69, p. 1148 (1947).

Sowden et al. (2) J. A. C. S., vol. 68, p. 1511-3 (1946).

Hass et al., Chemical Reviews, vol. 32, pp. 399 and 408 (1943).

Haskins et al., J. A. C. S., vol. 67, p. 1800-8 (1945).